UNITED STATES PATENT OFFICE.

EDOUARD V. J. L. GORGES, OF PARIS, FRANCE.

PROCESS FOR THE CONVERSION OF MARINE PLANTS INTO PULP, &c.

SPECIFICATION forming part of Letters Patent No. 231,484, dated August 24, 1880.

Application filed June 29, 1880. (No model.) Patented in France April 10, 1880.

*To all whom it may concern:*

Be it known that I, EDOUARD VINCENT JULES LAURENT GORGES, of Paris, France, chemist, have invented an Improved Process for the Conversion of Marine Plants, such as *Algæ, Fucus, Zostera,* &c., into Pulp suitable for the manufacture of paper and pasteboard, and for which I have received Letters Patent of France, dated April 10, 1880, and numbered 136,055; and I do hereby declare that the following is a full, clear, and exact description of the same.

This invention relates to an improved process for the conversion of marine plants, such as *Algæ, Fucus, Zostera,* &c., as well as other products of the vegetable kingdom generally, into pulp suitable for the manufacture of paper and pasteboard.

Marine plants and herbage are first incinerated to obtain an alkaline soda and potash lye, which is rendered caustic with milk of lime. In this caustic alkaline lye, which is preferably heated, the plants to be converted into pulp are placed and macerated for some hours, and when sufficiently treated they are drained and plunged into a bath of dilute sulphuric acid, and in a few moments the cellulose and ligneous fibers become converted into firm pulp suited for the purposes mentioned.

In order to neutralize the acids employed, the pulp is washed in another alkaline bath of soda, potash, or lime, after which it is bleached by the ordinary processes and the moisture expressed. In this manner an abundant amount of soft ligneous pulp may be obtained in a few hours without much expense, eminently suited for the manufacture of paper and pasteboard.

The process is equally applicable for the conversion into pulp for paper-making of all other products of the vegetable kingdom, such as the branches and leaves of trees and shrubs, aquatic plants, grasses, ferns, heather, broomfurze, brambles, straw, stalks, shells of pease and beans, mosses, couch-grass, &c. The plants, &c., after being slightly pounded or crushed between rollers, are steeped in an alkaline caustic lye, which may be used either cold or hot, or be evaporated to two or three atmospheres. The fibrous portions separate in a few moments. Pressure is then applied, and the product is washed in a bath of dilute acid and bleached by the methods usually employed.

I am aware that fibers have already been treated in alkaline lye and then steeped in dilute sulphuric acid. This I do not claim.

I claim—

The herein-described process for the conversion of plants and vegetable matter into pulp, which process consists in first placing the plants in caustic lye and macerating the same therein, then draining the same, next plunging them in dilute sulphuric acid, and finally washing the resulting pulp in an alkaline bath, substantially as specified.

EDOUARD VINCENT JULES LAURENT GORGES.

Witnesses:
ROBT. M. HOOPER,
JEAN BAPTISTE ROLLAND.